(No Model.)
E. J. DELANEY.
MIXING AND AGITATING APPARATUS FOR PLANT WASHES.
No. 321,089. Patented June 30, 1885.
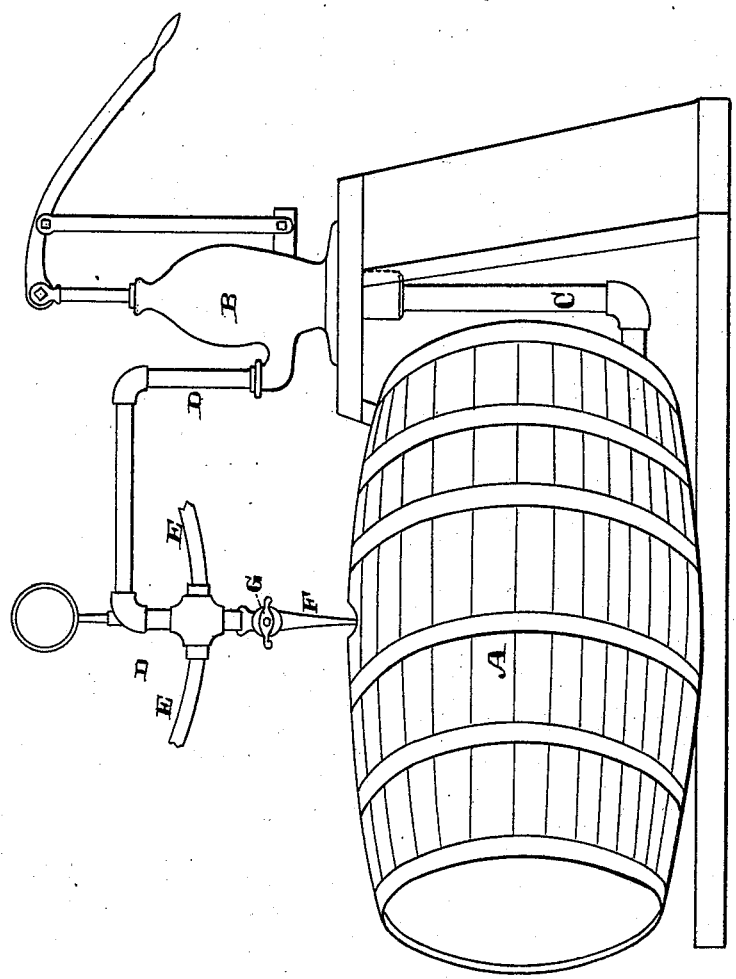

United States Patent Office.

EDWARD J. DELANEY, OF SAN JOSÉ, CALIFORNIA.

MIXING AND AGITATING APPARATUS FOR PLANT-WASHES.

SPECIFICATION forming part of Letters Patent No. 321,089, dated June 30, 1885.

Application filed April 9, 1885. (No model.)

*To all whom it may concern:*

Be it known that I, EDWARD J. DELANEY, of San José, county of Santa Clara, and State of California, have invented an Improvement in Mixing and Agitating Apparatus for Plant-Washes; and I hereby declare the following to be a full, clear, and exact description thereof.

My invention relates to an apparatus for mixing, agitating, and applying liquid washes or solutions to trees, plants, vines, &c.

It consists of a reservoir within which the liquid is placed, a pump connected with the lower part of said reservoir so as to draw the liquid therefrom, a pipe extending from the discharge-opening of the pump, and having its opening vertically above the top of the reservoir, so that the liquid may be discharged through this opening into the reservoir to mix and agitate the contents. In connection with this are secondary discharge pipes or nozzles, to which the spray apparatus may be attached, so that a portion of the liquid is being discharged or sprayed at all times upon the plants or trees to which it is to be applied.

Referring to the accompanying drawing for a more complete explanation of my invention, the figure is a view of my apparatus.

A is a cask or reservoir, within which the liquid or solution is contained. B is a pump of any suitable construction and dimensions, which is connected by pipe C, preferably, with the lower part of the reservoir, so as to draw the liquid therefrom and discharge it through the pipe D. This pipe has branches, as shown at E E, which are connected with spraying-nozzles of any suitable or desired construction, through which a small portion of the liquid may be discharged upon the trees, vines, or other plants which it is desired to treat. These two pipes or nozzles open out at right angles from the vertical portion of the pipe D, and this pipe is continued downward beyond these nozzles in a vertical direction, and has a discharge-nozzle, F, upon its end, with a regulating-cock, G, so that the force and amount of the discharge may be properly regulated. The greater portion of the liquid which is pumped from the receiver is discharged through this nozzle F vertically into the top of the receiver, thus causing a strong agitating current, which keeps the solution well mixed. This is especially necessary, because those mixtures which have been found most effective for the destruction of insects or vermin upon plants are usually composed of a mixture of coal-oil or other oils with water, or of other light and heavy ingredients which do not form an intimate union, and are thus liable to separate when allowed to stand for any length of time.

By my apparatus, a jet being thrown forcibly into the reservoir through the nozzle F causes a strong agitation, and mixes the contents, so that when drawn out through the pipe C the mixture is very thoroughly incorporated, and that portion which is discharged through the pipes E E and the spray-nozzles will be constantly kept in the proper proportions.

A pressure-gage may be attached to the pipe leading from the pump to show the force with which it is discharged into the receiver.

Having thus described my invention, what I claim as new, and desire to secure by Letters Patent, is—

In a mixing and agitating device for plant-washes, the combination, with the reservoir, of a pump having its suction connected with the lower part of the reservoir, and the discharge-pipe having branches and spray-nozzles, and a continuation or nozzle which discharges into the reservoir, together with a regulating-cock, substantially as herein described.

In witness whereof I have hereunto set my hand.

EDWARD J. DELANEY.

Witnesses:
H. C. LEE,
S. H. NOURSE.